F. M. STEVENS & H. G. CORDLEY.
SELF CLOSING FAUCET.
APPLICATION FILED DEC. 5, 1907.
906,665.
Patented Dec. 15, 1908.
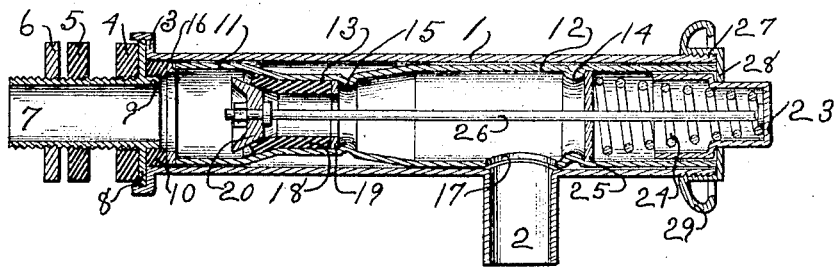
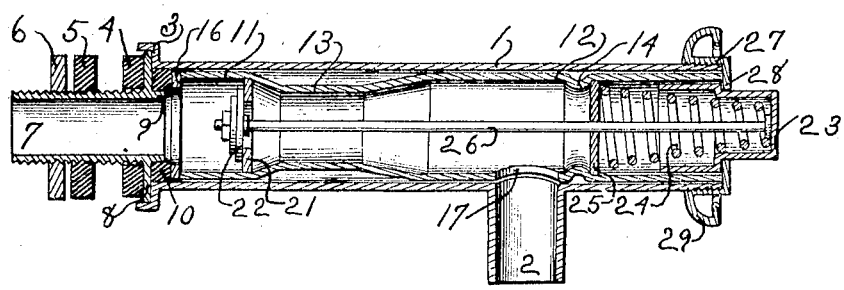

UNITED STATES PATENT OFFICE.

FREDERICK M. STEVENS, OF WATERBURY, CONNECTICUT, AND HENRY G. CORDLEY, OF GLENRIDGE, NEW JERSEY.

SELF-CLOSING FAUCET.

No. 906,665.  Specification of Letters Patent.  Patented Dec. 15, 1908.

Application filed December 5, 1907. Serial No. 405,168.

*To all whom it may concern:*

Be it known that we, FREDERICK M. STEVENS, a citizen of the United States, residing at Waterbury, Connecticut, and HENRY G. CORDLEY, a citizen of the United States, residing at Glenridge, in the county of Essex, State of New Jersey, have invented certain new and useful Improvements in Self-Closing Faucets, of which the following is a description, reference being had to the accompanying drawings, forming a part hereof.

Our invention relates to self closing faucets designed for use with water coolers; and the objects thereof are to produce a faucet in which the valve and operating parts therefor may be readily removed from the body or outer casing of the faucet for inspection or repair, to produce a faucet having an attractive external appearance, to produce a faucet which may be made readily and cheaply by approved manufacturing processes, and to otherwise improve upon existing faucets by features which will be apparent from the following description of our device.

With the above objects in view our invention consists in the improved self closing faucet illustrated in the accompanying drawing, described in the following specification, and specifically claimed in the clauses of the concluding claim.

In the drawing, Figure 1 is a view of our device taken upon a central vertical plane extending longitudinally thereof, and, Fig. 2 is a similar view of our device in which the form of valve and valve seat is slightly modified.

In said views 1 represents the body portion or external casing of our faucet, which it will be understood is of general cylindrical form and without projections except for the discharge spout 2. The external casing is flanged and provided with a cup 3 at its inner or left hand end within which rests a soft rubber washer or gasket 4 designed to contact with the external surface of the water cooler with which our faucet is designed to be used, and 5 is a second gasket and 6 a nut threaded upon the connecting nipple 7 by which the faucet is secured in place. The nipple 7 is provided with a projecting flange 8 which fits within the cup 3 and is preferably soldered in place. The nipple projects slightly into the outer casing 1 of the faucet, as at 9, and 10 is a packing ring resting against the flange 8 and extending to the inner surface of the casing 1 as shown.

Within the outer casing 1 of our faucet we place an inner casing designed to carry the valve of the faucet and the operating means therefor and to be readily removable from said outer casing, and which inner casing has formed in it all the irregularities of form and surface necessary to secure an operative faucet. Said removable inner casing comprises end sections 11 and 12 of substantially the same external diameter as the internal diameter of the outer casing 1, and an intermediate section 13 of reduced diameter within which the valve seat is located. The end section 12 of said inner casing is also provided with an inwardly projecting bead 14 adjacent the outer end thereof and serving as a support for one end of a spring for closing the valve of our faucet. A second inwardly projecting bead 15 is provided for retaining the valve seat in place, and an inwardly extending ledge 16 to secure a greater bearing surface upon the packing ring 10.

17 is an opening registering with the discharge spout 2 through which liquid flows when the valve is open.

Within the reduced section 13 is located a valve seat 18 which in Fig. 1 is shown as formed from a piece of rubber tubing, the outer or right hand end of which is supported by a ledge 19 resting against the bead 15.

20 is a metallic valve opening toward the left or inwardly into the inner end section 11 of the inner casing of our faucet and normally held to its seat by a suitable spring hereinafter described.

In the modified form of our device shown in Fig. 2, 21 is a metallic valve seat secured in the reduced section 13 of the inner casing of our faucet, and 22 is a soft rubber or similar yielding valve normally held to its seat by a suitable spring.

23 is a push button movable within and guided by the outer portion of the outer end section 12 of the removable inner casing of our faucet, and 24 is a spring located within the outer end of the section 12 one end of which is supported by a disk 25 resting against the bead 14 and the outer end of which rests against the inner surface of the push button 23 and tends to force it toward the right or outwardly to keep the valve 20 or 22 seated.

26 is a rod connecting the push button 23 with the valve 20 or 22 and through which the valve may be operated by pressing upon the push button 23.

The outer and inner casings of our faucet terminate at the right as illustrated in the drawing in a single plane when the parts are assembled, the inner casing projecting slightly before the parts are secured in place so that when forced into its final position a tight joint will be secured between the inner end thereof and the packing ring 10.

27 is a cap preferably threaded upon the outer end of the outer casing and having a projecting ledge 28 which engages the end of the inner casing and forces it to the left as the cap is tightened, thereby securing a tight joint between the inner end of the inner casing and the packing ring 10, and holding said inner casing in place. It will be seen that when the cap 27 is removed the inner casing and valve and operating means therefor may be readily withdrawn from the outer casing. The cap 27 is provided with an extended rim which is rolled over as seen at 29 and which forms a convenient support for the fingers when pressing upon the push button by the thumb to open the valve.

It will be seen that the disk 25 serves also as a guide for the valve operating rod 26, and these parts ordinarily fit sufficiently close to prevent water passing along the rod and into the chamber in which the spring is located. We may, however, provide the rod 26 with suitable packing if found necessary or desirable. The inner removable casing of our faucet whereby all the operating parts are carried is formed from a tube of thin metal of proper length and of uniform diameter by reducing the diameter of the portion thereof within which the valve seat is located. This may be accomplished by the process known as spinning, or by means of suitably formed rolls, or by other available mechanical processes. The inwardly projecting beads 14 and 15 are formed in the same way. An inner casing is thus produced at a minimum cost; as the tubing from which it is produced can be readily purchased in the open market, and the mechanical process by which a portion of a tube of proper length can be reduced in size to form a support for the valve seat are simple and easily carried out. The portion of the tube not operated upon in reducing a portion thereof to form a support for the valve seat form the end sections 11 and 12 of the finished casing. The outer casing 1 of our faucet is likewise formed from thin metallic tubing which when highly polished presents a pleasing appearance because of of the absence of projections or irregularities in the surface thereof.

Having thus described our invention and explained the operation thereof, we claim and desire to secure by Letters Patent:—

1. In a self-closing faucet, an outer casing of uniform internal diameter throughout; a removable inner casing within said outer casing and of substantially the same diameter as the internal diameter of said outer casing; a packing ring at the inner end of said inner casing; a cap at the outer end of said outer casing and in threaded engagement therewith and also in engagement with the outer end of said inner casing to hold it in place; a valve seat within said inner casing; an inwardly opening valve coöperating with said seat; a push button tubular in form and closed at its outer end located within the outer end of said inner casing, the periphery of which push button slides within and is guided by said inner casing and the closed end of which projects through said cap; a rod extending between the closed end of said push button and said valve; an abutment adjacent the outer end of said inner casing; and a spring extending between said abutment and the closed outer end of said push button.

2. In a self closing faucet, an outer casing of uniform internal diameter throughout a removable inner casing within said outer casing, said inner casing comprising end sections of substantially the internal diameter of said outer casing, and an intermediate section of reduced diameter; a valve seat supported within the reduced section of said inner casing; a valve coöperating with said seat; means for securing said inner casing in place within said outer casing, and a packing ring at the inner end of said inner casing whereby water is prevented from entering the space between said outer and inner casings.

3. In a self-closing faucet, an outer casing of uniform internal diameter throughout; a removable inner casing within said outer casing, said inner casing comprising end sections of substantially the internal diameter of said outer casing, and an intermediate section of reduced diameter; a valve seat located at the reduced portion of said inner casing; an inwardly opening valve coöperating with said seat; a push button located within the outer end of said inner section and adapted to operate said valve; a spring for normally keeping said valve seated; and means for securing said inner casing in place within said outer casing.

4. In a self-closing faucet, a casing including end sections and an intermediate section of reduced diameter, said reduced section forming a portion of a thin metallic tube having originally the same diameter as the end sections of said casing; a valve seat supported within the reduced section of said casing; a valve coöperating with said seat; a bead formed upon the interior of said casing adjacent the outer end thereof; a push button movable within the outer end of said casing; a spring one end of which is supported by said bead and the other end of which presses against said push button to force it outwardly; and a rod extending between said push button and said valve.

5. In a self-closing faucet, a casing including end sections and an intermediate section of reduced diameter, said reduced section forming a portion of a thin metallic tube having originally the same diameter as the end sections of said casing; a valve seat supported within the reduced section of said casing; a valve coöperating with said seat; a bead formed upon the interior of said casing adjacent the outer end thereof; a push button movable within the outer end of said casing; a spring one end of which is supported by said bead and the other end of which presses against said push button to force it outwardly; a second casing adapted to contain said first mentioned casing; and a cap secured upon the outer end of said second casing and adapted to engage the outer end of said first casing to hold it in place.

6. In a self-closing faucet; an outer casing of uniform internal diameter throughout; a removable inner casing within said outer casing and of substantially the same diameter as the internal diameter of said outer casing; a valve seat within said inner casing and intermediate the ends thereof; an inwardly opening valve coöperating with said seat; a push button located at the outer end of said inner casing and adapted to slide within said inner casing; a rod extending between said push button and said valve; a spring located within the outer end of said inner casing and acting to force said push button outwardly; and a cap secured upon the outer end of said outer casing and having a portion in engagement with the outer end of said inner casing to hold it in place.

7. In a self closing faucet, an outer casing; a nipple whereby said faucet may be secured to a suitable receptacle; a flange projecting from said nipple and to which said outer casing is secured; a packing ring within said casing and resting against one side of said flange, a second packing ring surrounding said nipple and resting against the other side of said flange; an inner casing; means for forcing said inner casing against said packing ring; an inwardly opening valve located within said inner casing; and means for operating said valve.

8. In a self-closing faucet, an outer casing of uniform internal diameter throughout; a removable inner casing within said outer casing and of substantially the same diameter as the internal diameter of said outer casing; a packing ring at the inner end of said inner casing; a cap at the outer end of said outer casing and in threaded engagement therewith and also in engagement with the outer end of said inner casing to hold it in place; a valve seat within said inner casing; an inwardly opening valve coöperating with said seat; a push button located within the outer end of said inner casing, the periphery of which push button slides within and is guided by said inner casing and the end of which projects through said cap; a rod extending between said push button and said valve; an abutment adjacent the outer end of said inner casing; and a spring extending between said abutment and said push button.

This specification signed and witnessed this 4th day of November A. D. 1907.

FREDERICK M. STEVENS.

Witnesses:
HENRY FAHL,
L. H. BASSETT.

This specification signed and witnessed this 6th day of November A. D. 1907.

HENRY G. CORDLEY.

Witnesses:
GEORGE A. BOWE,
W. L. REIS.